(12) United States Patent
Miyoshi

(10) Patent No.: US 7,586,866 B2
(45) Date of Patent: Sep. 8, 2009

(54) RADIO COMMUNICATION APPARATUS AND RADIO TRANSMISSION METHOD

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 666 days.

(21) Appl. No.: 10/539,088

(22) PCT Filed: Dec. 12, 2003

(86) PCT No.: PCT/JP03/15946

§ 371 (c)(1),
(2), (4) Date: Jun. 15, 2005

(87) PCT Pub. No.: WO2004/062153

PCT Pub. Date: Jul. 22, 2004

(65) Prior Publication Data

US 2006/0067207 A1 Mar. 30, 2006

(30) Foreign Application Priority Data

Dec. 25, 2002 (JP) .............................. 2002-375265

(51) Int. Cl.
*H04B 7/216* (2006.01)
(52) U.S. Cl. .................. 370/320; 370/335; 370/342
(58) Field of Classification Search ................. 370/203, 370/210, 276, 277, 278, 282, 310, 319, 320, 370/204, 208, 209; 375/130, 140, 146
See application file for complete search history.

(56) References Cited

U.S. PATENT DOCUMENTS

| 6,351,458 | B2* | 2/2002 | Miya et al. .................. 370/330 |
|---|---|---|---|
| 6,515,980 | B1 | 2/2003 | Bottomley |
| 6,636,723 | B1 | 10/2003 | Kitagawa et al. |
| 6,671,340 | B1* | 12/2003 | Kroeger et al. .............. 375/350 |
| 6,680,928 | B1* | 1/2004 | Dent .......................... 370/342 |
| 6,873,651 | B2* | 3/2005 | Tesfai et al. ................. 375/219 |
| 2002/0061051 | A1* | 5/2002 | Kitahara ..................... 375/144 |
| 2002/0159425 | A1 | 10/2002 | Uesugi et al. |
| 2002/0181421 | A1 | 12/2002 | Sano et al. |

FOREIGN PATENT DOCUMENTS

| JP | 11274983 | 10/1999 |
|---|---|---|
| JP | 2000 101478 A | 4/2000 |
| JP | 2000 349689 A | 12/2000 |
| JP | 2002 016512 A | 1/2002 |
| JP | 2002 190788 A | 7/2002 |
| JP | 2002 237795 A | 8/2002 |
| JP | 2002 271296 A | 9/2002 |

(Continued)

OTHER PUBLICATIONS

PCT International Search Report dated Mar. 30, 2004.

(Continued)

*Primary Examiner*—Chirag G Shah
*Assistant Examiner*—Daniel Mitchell
(74) *Attorney, Agent, or Firm*—Dickinson Wright, PLLC

(57) ABSTRACT

In order to improve reception performance, while reducing the arithmetic amount of a receiver apparatus in a multicarrier CDMA system, different weightings are performed for the respective spread codes (chips) included in subcarriers in addition to performing weightings for the respective subcarriers.

3 Claims, 7 Drawing Sheets

FOREIGN PATENT DOCUMENTS

| | | | |
|---|---|---|---|
| JP | 2003 510883 | A | 3/2003 |
| JP | 2003 525532 | A | 8/2003 |
| JP | 2003 533068 | A | 11/2003 |
| WO | 0038448 | | 6/2000 |
| WO | 0108326 | A1 | 2/2001 |
| WO | 01/97416 | | 12/2001 |
| WO | 02009334 | | 1/2002 |

OTHER PUBLICATIONS

K. Miyashita, et al.; "Eigenbeam-Space Division Multiplexing (E-SDM) in a MIMO Channel," IEICE RCS2002-53 (May 2002), pp. 13-18 with English Abstract.

N. Maeda, et al.; "Performance of Forward Link Broadband OFCDM Packet Wireless Access using MMSE Combining Scheme based on SIR Estimation," IEICE, A-P2001-127, RCS2001-166 (Oct. 2001), pp. 105-111 with English Abstract.

S. Nobilet, et al.; "Performance of predistortion techniques for uplink MC-CDMA systems with TDD and FDD modes," IEEE, Oct. 2002, pp. 655-662.

Chinese Office Action dated Dec. 12, 2008 with English-language translation.

J. Wang, et al. "A Novel Multipath Diversity Scheme in TDD-CDMA Systems," ACTA Electronica Sinica, vol. 27, No. 11A, Nov. 30, 1999, pp. 69-71.

* cited by examiner

| SUBCARRIER | #1 | #2 | #3 | #4 |
|---|---|---|---|---|
| CODE #A | 0.8 | 0.5 | 0.6 | 0.7 |
| CODE #B | 0.8 | 0.5 | 0.8 | 0.9 |
| CODE #C | 0.7 | 0.6 | 0.6 | 0.7 |
| CODE #D | 0.9 | 0.9 | 0.6 | 0.5 |

RADIO COMMUNICATION APPARATUS AND RADIO TRANSMISSION METHOD

TECHNICAL FIELD

The present invention relates to a radio communication apparatus and radio transmission method based on a multi-carrier transmission scheme.

BACKGROUND ART

Conventionally, a multicarrier CDMA (Code Division Multiple Access) system is designed in such a way that a transmission apparatus spreads transmission data in a frequency axis direction and sends code-multiplexed data. The data transmitted is received by a reception apparatus under the influence of frequency selective fading, and therefore orthogonality among spreading codes is lost at the reception apparatus and the reception performance deteriorates. To reduce the loss of orthogonality among spreading codes and improve the reception performance, a method of improving the reception performance by carrying out despreading using an algorithm such as MMSE (Minimum Mean Square Error) is widely known (e.g., see Document 1 "Performance of Forward Link Broadband OFCDM Packet Wireless Access using MMSE Combining Scheme based on SIR Estimation" Institute of Electronics, Technical Report of IEICE, RCS2001-166, October 2001, pp. 105-111).

Furthermore, if the same power is set for respective subcarriers at the reception apparatus, orthogonality among spreading codes is not lost at the reception apparatus, and therefore a method is conceived whereby the transmission apparatus adjusts transmit power of subcarriers beforehand and sends the subcarriers so that reception power becomes equal for all the subcarriers at the reception apparatus (e.g., see Document 2 "Performance of predistortion techniques for uplink MC-CDMA systems with TDD and FDD modes, International Conference The Fifth International Symposium on Wireless Personal Multimedia Communications (WPMC' 02) October 2002, pp. 655-662").

However, the reception method applying the MMSE algorithm disclosed in Document 1 above requires the reception apparatus to measure noise power, which makes the configuration of the reception apparatus more complicated. Furthermore, depending on the condition of a propagation environment, it is difficult to completely recover the loss of orthogonality among spreading codes, which results in a problem that it is not always possible to obtain optimum reception performance.

Furthermore, according to the method disclosed in Document 2 above, the reception apparatus is designed to perform EGC (equal gain) combining, which results in a problem that the reception performance deteriorates, compared to the case where MRC combining is performed.

FIG. 1 is a block diagram showing the configuration of a conventional transmission apparatus 10. In the transmission apparatus 10, transmission data directed to respective reception apparatuses are input to spreading sections 11 and serial/parallel (S/P) conversion sections 12, the number of which is equivalent to the code multiplexing number (number of reception apparatuses).

The spreading section 11 performs spreading processing on the transmission data using a predetermined spreading code and then supplies the spread signal to the S/P conversion section 12. The S/P conversion section 12 converts the spread serial signal to parallel signals and creates, for example, four subcarriers and supplies the subcarriers to their respective adders 13-1 to 13-4.

The adder 13-1 adds up a first subcarrier which is output from a first combination of the spreading sections 11 and S/P conversion sections 12, the number of which is equivalent to the code multiplexing number (number of reception apparatuses) and a first subcarrier which is output from a second combination of the spreading sections 11 and S/P conversion sections 12. In the first subcarrier, a signal spread by a first spreading code for a first user (first reception apparatus) and a signal spread by a second spreading code for a second user (second reception apparatus) are added up and the first subcarrier is constructed in this way. This first subcarrier is supplied to a multiplier 14-1.

Likewise, the other adders 13-2 to 13-4 also perform additions between the second subcarriers, between the third subcarriers and between the fourth subcarriers output from the respective combinations of the spreading sections 11 and S/P conversion sections 12 corresponding to the respective users (reception apparatuses) and supply the results to multipliers 14-2 to 14-4. The multipliers 14-1 to 14-4 multiply the respective subcarriers by weighting factors calculated by a weighting factor calculation section 23 for the respective subcarriers.

The outputs of the multipliers 14-1 to 14-4 are supplied to an IFFT (Inverse Fast Fourier Transform) processing section 15. By superimposing the respective subcarriers, the IFFT processing section 15 generates an OFDM signal (multicarrier signal) and supplies this OFDM signal to a GI (Guard Interval) addition section 16. After adding a guard interval to the OFDM signal, the GI addition section 16 supplies the OFDM signal to a transmission RF (Radio Frequency) section 17. The transmission RF section 17 carries out predetermined radio transmission processing (e.g., D/A conversion and up-conversion, etc.) on the signal with the guard interval inserted and transmits the signal after this radio transmission processing through an antenna 18 as a radio signal.

The signal transmitted from the transmission apparatus 10 is received by a reception apparatus. FIG. 2 is a block diagram showing the configuration of a reception apparatus 30. The received signal received at a reception RF section 32 through an antenna 31 in the reception apparatus 30 is subjected to predetermined radio reception processing (e.g., down-conversion and A/D conversion, etc.) here. The reception RF section 32 supplies the signal after this radio reception processing to a GI elimination section 33.

The GI elimination section 33 removes the guard interval inserted in the signal after the radio reception processing and supplies the signal after the guard interval elimination to an FFT (Fast Fourier Transform) processing section 34. The FFT processing section 34 performs a serial/parallel (S/P) conversion on the signal after the guard interval elimination, carries out FFT processing on the signal after the S/P conversion, converts the signal to information pieces for the respective subcarriers and supplies pilot symbols which are known signals of the signal after the FFT processing to a channel estimation section 35 for the respective subcarriers.

The channel estimation section 35 performs channel estimation on the respective subcarriers using the pilot symbols for the respective subcarriers and supplies the channel estimation values obtained for the respective subcarriers to an EGC coefficient calculation section 36 and a control channel transmission section 39.

The EGC (Equal Gain Combining) coefficient calculation section 36 calculates EGC coefficients for carrying out equal gain combining for the channel estimation values for the respective subcarriers and supplies these EGC coefficients to multipliers 37-1 to 37-4. The multipliers 37-1 to 37-4 multiply the respective subcarriers after the FFT processing output from the FFT processing section 34 by the coefficients supplied from the EGC coefficient calculation section 36, supply the multiplication results to a despreading section 38, and thereby carry out ECG despreading processing.

Furthermore, the control channel transmission section 39 is intended to transmit the channel estimation values of the respective subcarriers supplied from the channel estimation section 35 through a control channel and supplies the respective channel estimation values to a transmission RF section 40. The transmission RF section 40 carries out predetermined radio transmission processing (e.g., D/A conversion and upconversion, etc.) on the respective channel estimation value information pieces and transmits the signal after this radio transmission processing through an antenna 41 as a radio signal.

The transmission apparatus 10 (FIG. 1) which has received the signal transmitted from this reception apparatus 30 carries out predetermined radio reception processing (e.g., downconversion and A/D conversion, etc.) on the received signal at a reception RF section 20 and supplies the signal after this radio reception processing to a control channel reception section 21. The control channel reception section 21 extracts a control channel from the received signal and supplies data of this extracted control channel to a channel information detection section 22.

The channel information detection section 22 detects the channel estimation values of the respective subcarriers transmitted from the reception apparatus through the control channel as feedback information and supplies these channel estimation values to the weighting factor calculation section 23. The weighting factor calculation section 23 calculates weighting factors from the channel estimation values of the respective subcarriers and supplies the calculated weighting factors to the multipliers 14-1 to 14-4. As these weighting factors, the reciprocals of the channel estimation values of the respective subcarriers are used as shown in FIG. 3. In this way, the transmission apparatus 10 transmits subcarriers having small reception power at the reception apparatus 30 with increased transmit power, while the transmission apparatus 10 transmits subcarriers having large reception power at the reception apparatus 30 with decreased transmit power, thus allowing the reception apparatus 30 to receive the respective subcarriers with constant reception power. Assuming that reception power is fixed, the reception apparatus 30 despreads the signal by restoring only a change in the phase (equal gain combining type despreading), and can thereby recover orthogonality among spreading codes even if there is frequency selective fading.

As shown in FIG. 4, in the conventional transmission apparatus 10 in such a configuration, the respective subcarriers (#1 to #4) have different transmit power values due to weighting, but the transmit power is fixed for all spreading codes (all users) in each subcarrier.

As shown above, a conventional multicarrier CDMA system using EGC (equal gain combining) carries out weighting for each subcarrier and only equalizes power of received signals at a reception apparatus, and therefore it is difficult to optimize an SNR (Signal to Noise Ratio) though the reception apparatus can recover orthogonality among spreading codes.

DISCLOSURE OF INVENTION

It is an object of the present invention to provide a radio transmission apparatus and a radio transmission method in a multicarrier CDMA system capable of improving reception performance while reducing an amount of calculation at a reception apparatus.

In order to attain this object, in a multicarrier CDMA system, the present invention not only carries out weighting for each subcarrier but also carries out weighting which differs from one spreading code (chip) to another included in each subcarrier.

BEST MODE FOR CARRYING OUT THE INVENTION

With reference now to the attached drawings, an embodiment of the present invention will be explained in detail below.

Figure 5:
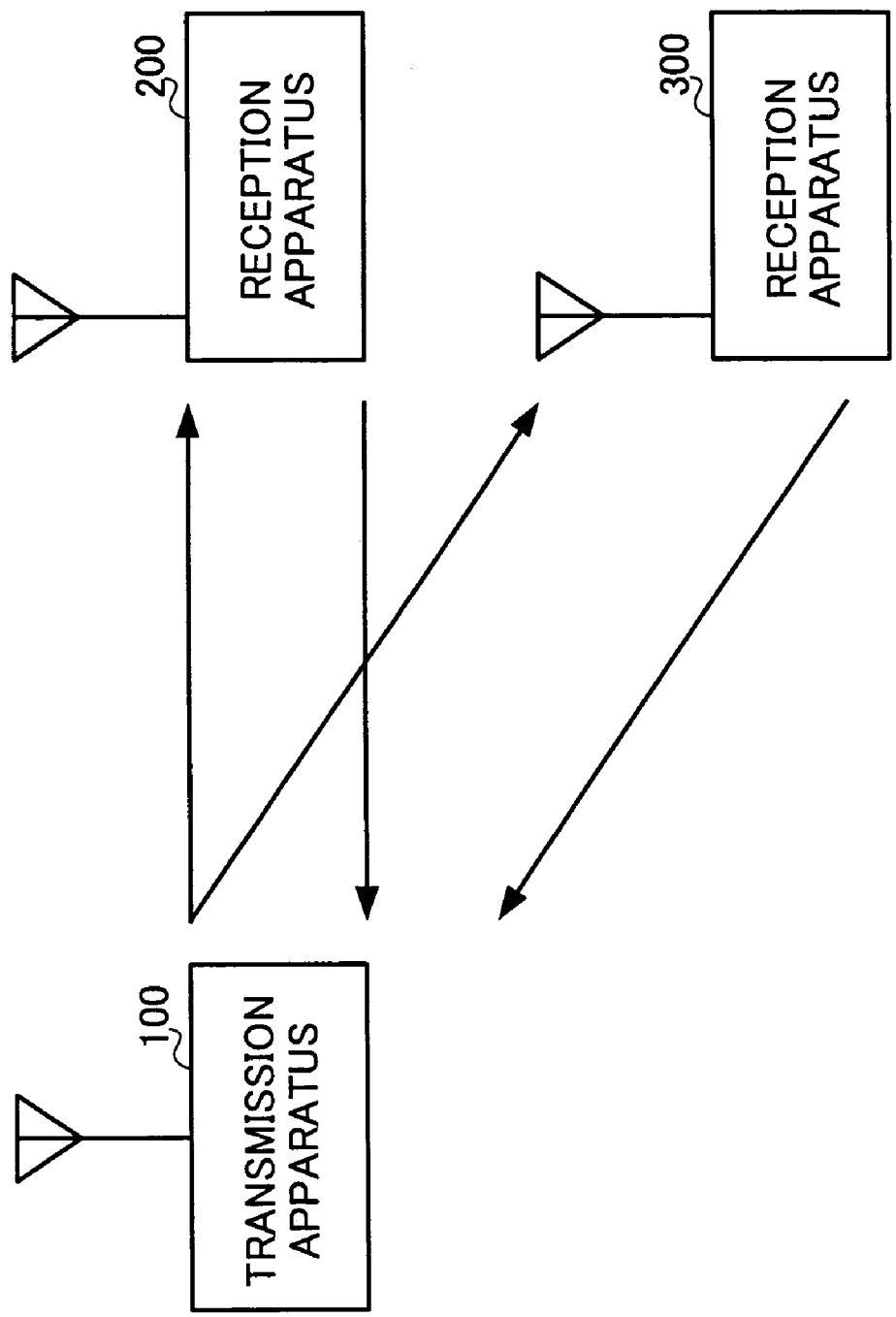
FIG. 5 is a block diagram showing the configuration of a radio communication system according to an embodiment of the present invention.
Figure 6:
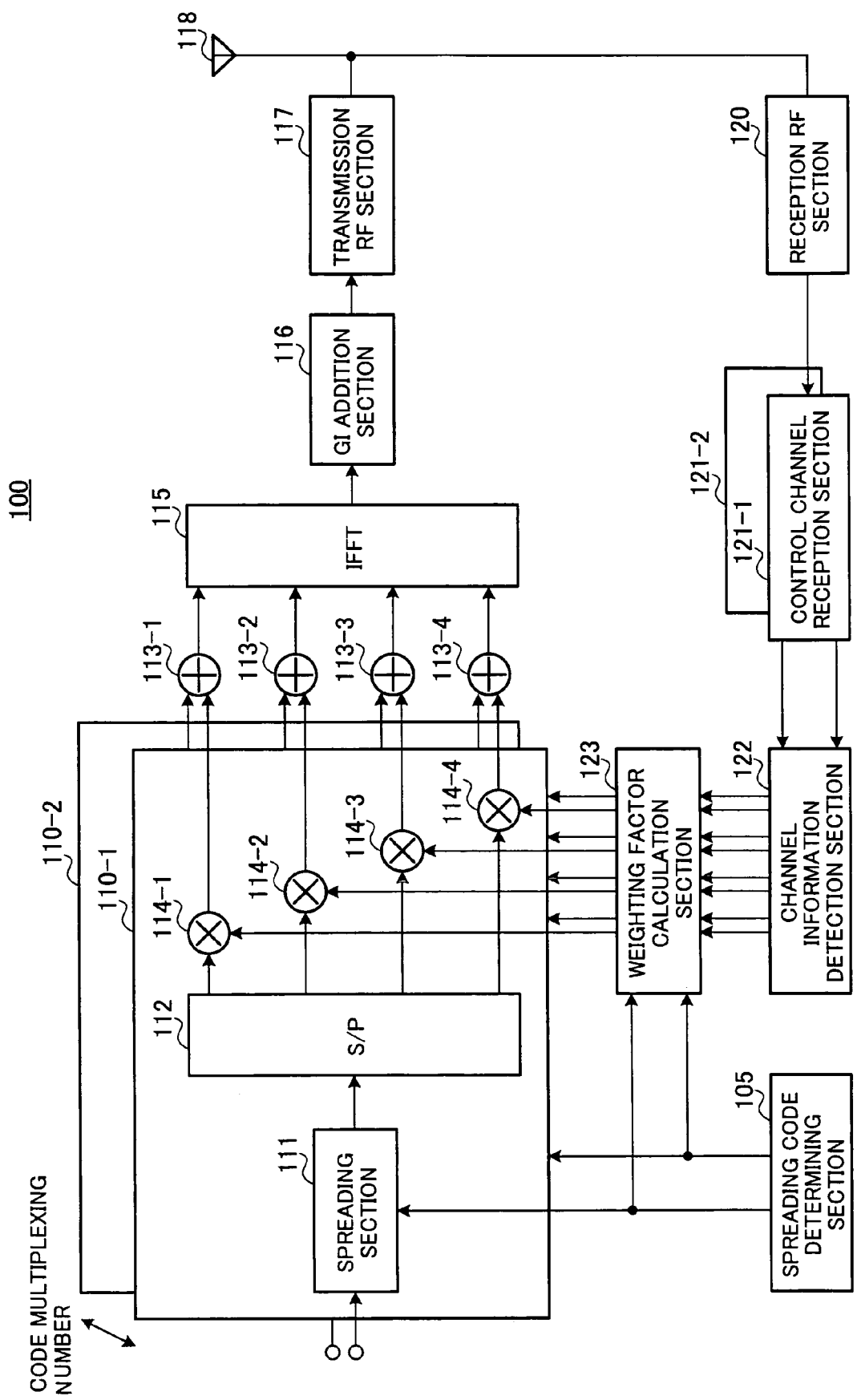
FIG. 6 is a block diagram showing the configuration of a transmission apparatus according to the embodiment of the present invention.

FIG. 5 is a block diagram showing the configuration of a radio communication system according to a multicarrier CDMA scheme using a radio communication apparatus 100 according to the present invention. In this radio communication system, radio communication is carried out according to a multicarrier CDMA scheme between the transmission apparatus 100 and a plurality of reception apparatuses 200, 300, . . . . FIG. 6 is a block diagram showing the configuration of the transmission apparatus 100. In the transmission apparatus 100, transmission data directed to the respective reception apparatuses are input to spreading processing sections 110-1, 110-2, . . . , the number of which is equivalent to the code multiplexing number (number of reception apparatuses), each including a spreading section 111, a serial/parallel (S/P) conversion section 112 and multipliers 114-1 to 114-4.

The spreading section 111 carries out spreading processing on the transmission data using a predetermined spreading code and supplies the spread signal to the S/P conversion section 112. The S/P conversion section 112 converts the spread serial signal to parallel signals, thereby generates, for example, four subcarriers and supplies the subcarriers to their corresponding multipliers 114-1 to 114-4. The multipliers 114-1 to 114-4 multiply the respective subcarriers by weighting factors calculated for the respective subcarriers and respective spreading codes (chips) at a weighting factor calculation section 123.

The results of multiplications by the respective weighting factors are supplied to respective adders 113-1 to 113-4 corresponding to the respective subcarriers. The adder 113-1 adds up a first subcarrier output from the first spreading processing section 110-1 out of the spreading processing sections 110-1, 110-2, ..., the number of which is equivalent to the code multiplexing number (number of reception apparatuses) and a first subcarrier output from the second spreading processing section 110-2. This causes a signal spread by a first spreading code for a first user (first reception apparatus) and a signal spread by a second spreading code for a second user (second reception apparatus) to be added up in the first subcarrier. This first subcarrier is supplied to an IFFT (Inverse Fast Fourier Transform) processing section 115.

Furthermore, the other adders 113-2 to 113-4 likewise perform additions between second subcarriers, between third subcarriers and between fourth subcarriers output from the corresponding spreading processing sections 110-1, 110-2, ... for the respective users (reception apparatuses) and supply the addition results to the IFFT processing section 115.

The IFFT processing section 115 generates an OFDM signal (multicarrier signal) by superimposing the respective subcarriers and supplies the OFDM signal to a GI (Gird Interval) addition section 116. The GI addition section 116 adds a guard interval to the OFDM signal and then supplies the OFDM signal to a transmission RF (Radio Frequency) section 117. The transmission RF section 117 carries out predetermined radio transmission processing (e.g., D/A conversion or up-conversion, etc.) on the signal with the guard interval inserted and transmits the signal after this radio transmission processing through an antenna 118 as a radio signal.

Figure 7:
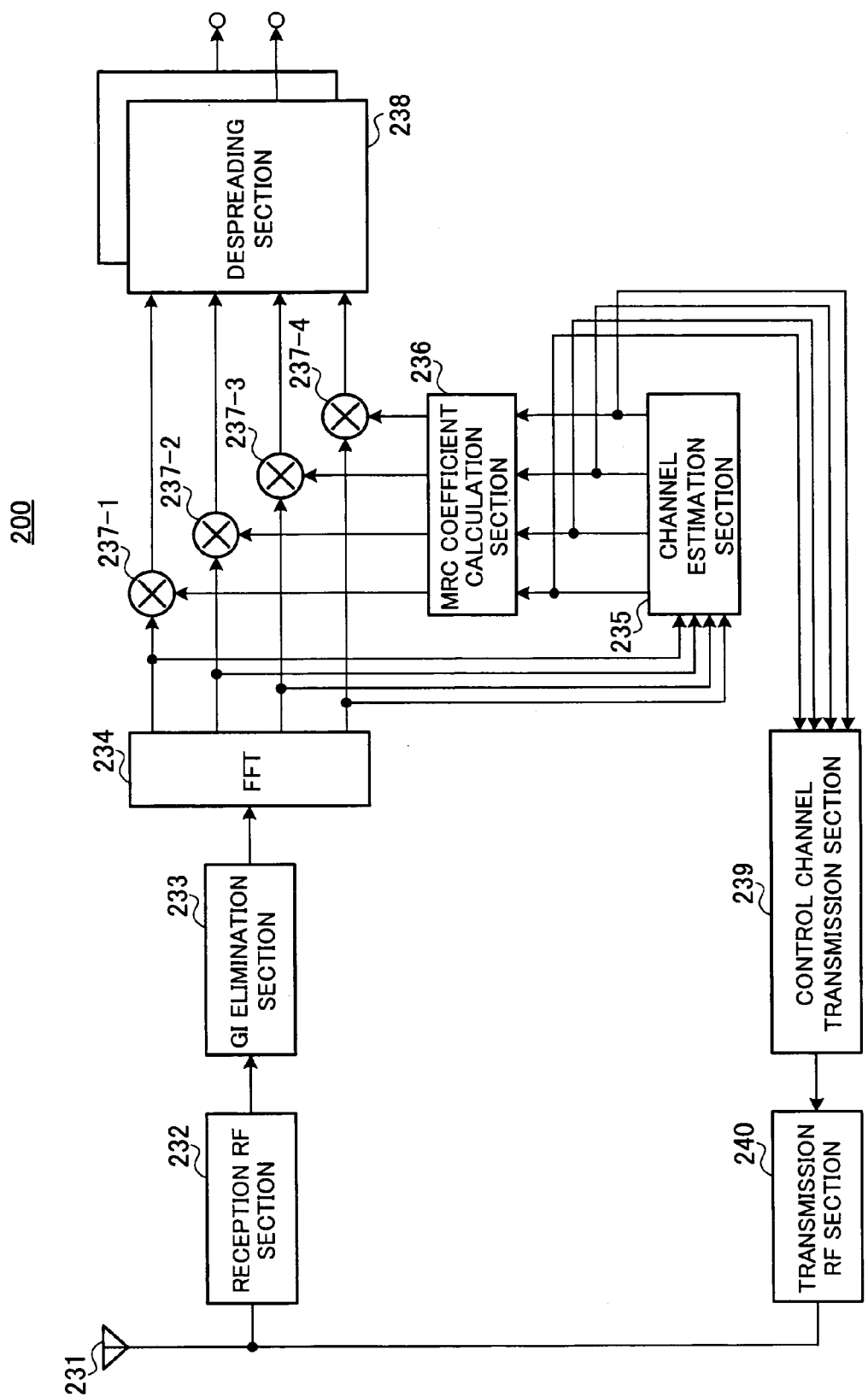
FIG. 7 is a block diagram showing the configuration of a reception apparatus according to the embodiment of the present invention.

The signal transmitted from the transmission apparatus 100 is received by a reception apparatus. FIG. 7 is a block diagram showing the configuration of a reception apparatus 200. At the reception apparatus 200, the signal received by a reception RF section 232 through an antenna 231 is subjected to predetermined radio reception processing (e.g., down-conversion or A/D conversion, etc.) here. The reception RF section 232 supplies the signal after this radio reception processing to a GI elimination section 233.

The GI elimination section 233 removes the guard interval inserted in the signal after the radio reception processing and supplies the signal after the guard interval elimination to an FFT (Fast Fourier Transform) processing section 234. The FFT processing section 234 carries out a serial/parallel (S/P) conversion on the signal after the guard interval elimination, carries out FFT processing on the signals after S/P conversion to convert the signals into information pieces for the respective subcarriers and supplies pilot symbols which are known signals of the signals after this FFT processing to a channel estimation section 235 for the respective subcarriers.

The channel estimation section 235 carries out channel estimation for the respective subcarriers using these pilot symbols for the respective subcarriers and supplies the channel estimation values obtained for the respective subcarriers to an MRC coefficient calculation section 236 and a control channel transmission section 239.

The MRC (Maximal Ratio Combining) coefficient calculation section 236 calculates MRC coefficients to perform maximal ratio combining on the channel estimation values for the respective subcarriers and supplies these MRC coefficients (coefficients whose magnitude corresponds to the reception level) to multipliers 237-1 to 237-4. The multipliers 237-1 to 237-4 multiply the respective subcarriers after the FFT processing output from the FFT processing section 234 by the coefficients supplied from the MRC coefficient calculation section 236 and supply the multiplication results to a despreading section 238 for MRC despreading processing.

On the other hand, the control channel transmission section 239 is intended to transmit the channel estimation values of the respective subcarriers supplied from the channel estimation section 235 through control channels and supplies the respective channel estimation values to a transmission RF section 240. The transmission RF section 240 carries out predetermined radio transmission processing (e.g., D/A conversion or up-conversion, etc.) on the respective channel estimation value information pieces and transmits the signal after this radio transmission processing through the antenna 231 as a radio signal.

The transmission apparatus 100 (FIG. 6) which has received the signal transmitted from this reception apparatus 200 carries out predetermined radio reception processing (e.g., down-conversion or A/D conversion, etc.) on the received signal at a reception RF section 120 and supplies the signal after this radio reception processing to control channel reception sections 121-1, 121-2, .... The control channel reception sections 121-1, 121-2, ... extract control channels from the received signal and supply the data of the extracted control channels to a channel information detection section 122.

The channel information detection section 122 detects the channel estimation values for the respective subcarriers transmitted from the reception apparatus through the control channels as feedback information and supplies these channel estimation values to the weighting factor calculation section 123. The weighting factor calculation section 123 calculates weighting factors from the channel estimation values for the respective subcarriers and respective spreading codes (chips) and supplies the calculated weighting factors to the multipliers 114-1 to 114-4. These weighting factors are such weighting factors that orthogonality among the respective spreading codes is secured when the reception apparatus carries out MRC despreading on the received signal.

Figures 8, 9:
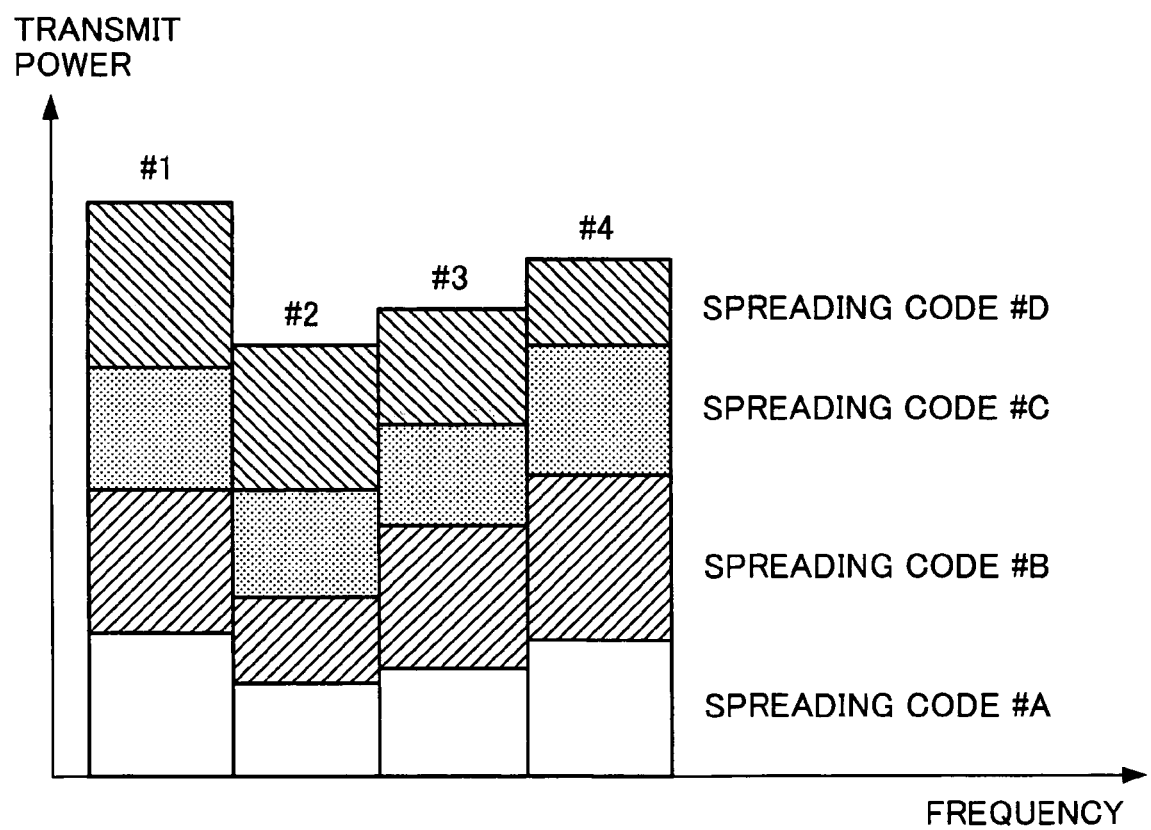
FIG. 8 is a schematic diagram showing weighting factors according to the embodiment of the present invention.
FIG. 9 is a schematic diagram showing weighting results according to the embodiment of the present invention.

These weighting factors are calculated, for example, for the respective subcarriers and for the respective spreading codes (chips) as shown in FIG. 8. The subcarriers are multiplied by these calculated weighting factors at the multipliers 114-1 to 114-4 of the respective spreading processing sections 110-1, 110-2, ..., and in this way, weighting is performed for the respective subcarriers and the respective spreading codes (chips) of the subcarriers.

Here, the method of calculating weighting factors at the weighting factor calculation section 123 will be explained. Assuming that the number of users (reception apparatuses) is K, when a transmission stream $S_k(t)$ corresponding to K users is transmitted with a weight vector $w_k$, this weight vector $w_k$ is determined as follows.

First, an eigenvalue vector $e_k$ with respect to a matrix $B=A^H A$ determined from a propagation path matrix A is calculated. This eigenvalue vector $e_k$ is a vector that satisfies the following expression:

$$e_i^H A^H A e_i = \lambda_i \ (\lambda_k \text{ is the kth eigenvalue})$$

$$e_i^H A^H A e_j = 0 \ (i \neq j)$$

Then, a weighting factor is calculated at the weighting factor calculation section 123 using the eigen vector $e_k$ as the transmission weight vector $w_k$ and the weighting with this calculated factor is performed to each subcarrier. A signal $x(t)$ transmitted using such a weighting factor is expressed in Expression (1) below:

$$x(t) = \sum_{k=1}^{K} w_k s_k(t) \quad (1)$$

At this time, a received signal vector r(t) at the reception apparatus is expressed by Expression (2) below:

$$r(t) = A \sum_{k=1}^{K} w_k s_k(t) + n(t) \quad (2)$$

where, n(t) in Expression (2) denotes noise.

Next, assuming that the weighting factor at the time of reception at the reception apparatus is $(Ae_k)^H$, a signal y(t) after MRC processing is expressed by Expression (3) below:

$$y(t) = w_k^H A^H A \sum_{m=1}^{K} w_m s_m(t) + w_k^H A^H n(t) \quad (3)$$
$$= \lambda_k s_k(t) + w_k^H A^H n(t)$$

where, $w_k^H A^H n(t)$ denotes noise. $\lambda_k s_k(t)$ in this Expression (3) is the target transmission stream.

At this time, the expression is developed using the following relations:

$e_i^H A^H A e_i = \lambda_i$ ($\lambda_k$ is the kth eigenvalue)

$e_i^H A^H A e_j = 0$ ($i \neq j$)

This completely eliminates interference from other users and allows reception whose reception SNR reaches a maximum.

In the transmission apparatus 100 in such a configuration, transmit power of the respective subcarriers (#1 to #4) varies depending on the weighting as shown in FIG. 9, and in addition, transmit power of the respective spreading codes (users) in the subcarriers also varies depending on the weighting. The weighting factors for the respective spreading codes are set to values that secure orthogonality, that is, values that compensate for a loss of orthogonality in the propagation path beforehand when an MRC is carried out at the reception apparatus 200 (a signal having a large reception level is multiplied by a large weighting factor and a signal having a small reception level is multiplied by a small weighting factor). In other words, even if the reception apparatus 200 carries out MRC, weighting factors used for that MRC maintain the magnitude relationship between received signal levels, and therefore when the transmission apparatus 100 multiplies the transmission signal by weighting factors that compensate for orthogonality beforehand, the orthogonality is secured at the reception apparatus 200.

Transmission data with such weighting are received by the reception apparatuses 200, 300, . . . , and the received signals are subjected to MRC despreading, and it is thereby possible to secure orthogonality among spreading codes. Then, the SNR is also optimized as the characteristic intrinsic to MRC despreading.

As shown above, according to the transmission apparatus 100 of this embodiment, spread signals are transmitted with weights which vary from one chip to another and from one spreading code to another assigned thereto, and therefore it is possible to obtain a received signal with an optimum SNR while maintaining orthogonality among spreading codes when the reception apparatus carries out MRC despreading. That is, the reception apparatus can make the optimization of the SNR of the received signal compatible with the securing of orthogonality among spreading codes and thereby improve reception performance.

The above described embodiment has described the case where one-to-multiple communication is carried out, but the present invention is not limited to this and is also applicable to a case where one-to-one communication is carried out.

Furthermore, the transmission apparatus and reception apparatus according to this embodiment are preferably mounted on a radio communication terminal apparatus and radio communication base station apparatus used in a mobile communication system.

As has been explained so far, the present invention can improve reception performance at a reception apparatus in a multicarrier CDMA system by not only carrying out weighting for each subcarrier but also assigning weights varying from one spreading code to another included in each subcarrier.

This application is based on the Japanese Patent Application No. 2002-375265 filed on Dec. 25, 2002, entire content of which is expressly incorporated by reference herein.

INDUSTRIAL APPLICABILITY

The present invention is applicable to a radio communication terminal apparatus and radio communication base station apparatus used in a mobile communication system.

Figure 1:
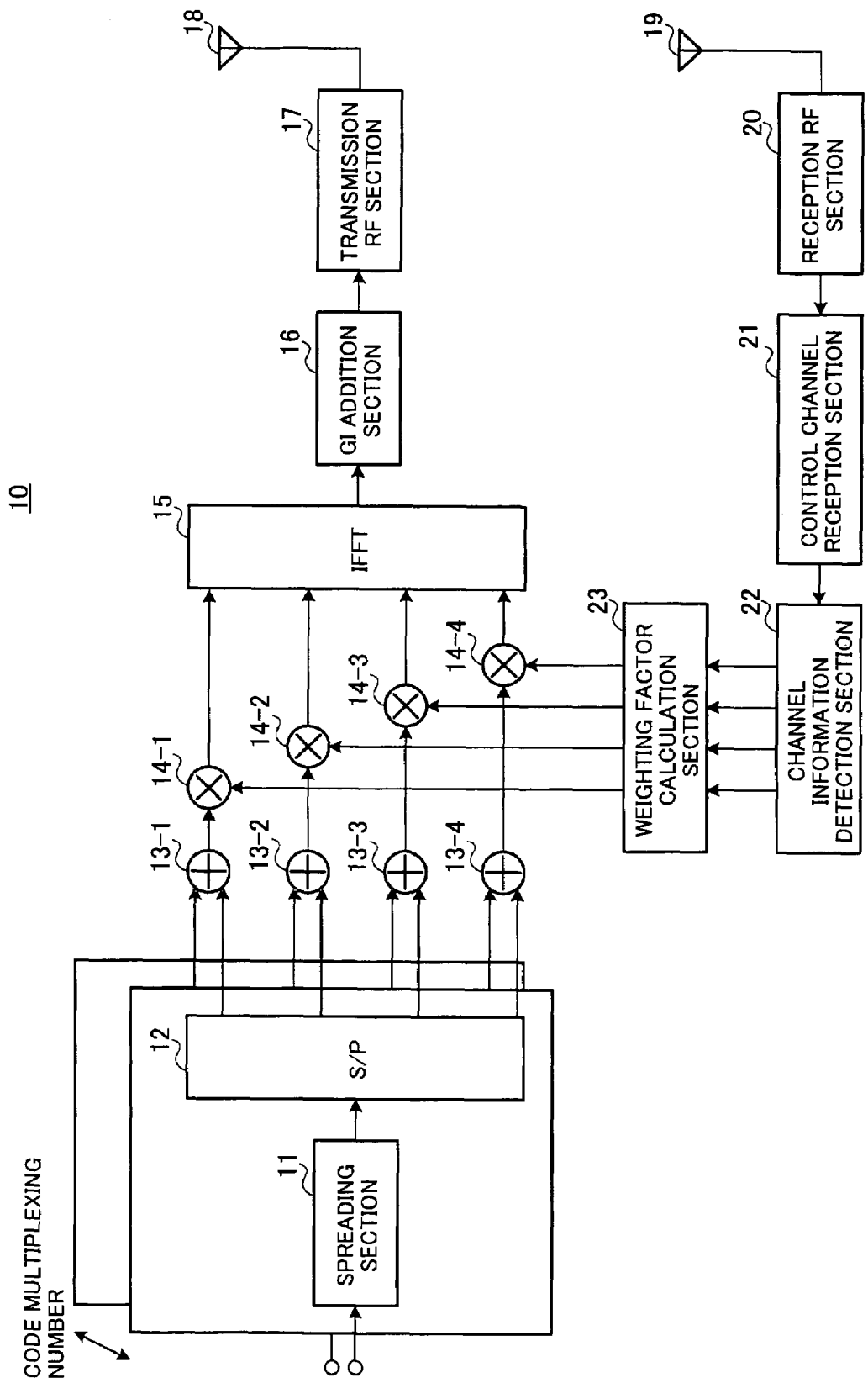
FIG. 1 is a block diagram showing the configuration of a conventional transmission apparatus.

[FIG. 1]
CODE MULTIPLEXING NUMBER
11 SPREADING SECTION
16 GI ADDITION SECTION
17 TRANSMISSION RF SECTION
23 WEIGHTING FACTOR CALCULATION SECTION
22 CHANNEL INFORMATION DETECTION SECTION
21 CONTROL CHANNEL RECEPTION SECTION
20 RECEPTION RF SECTION

Figure 2:
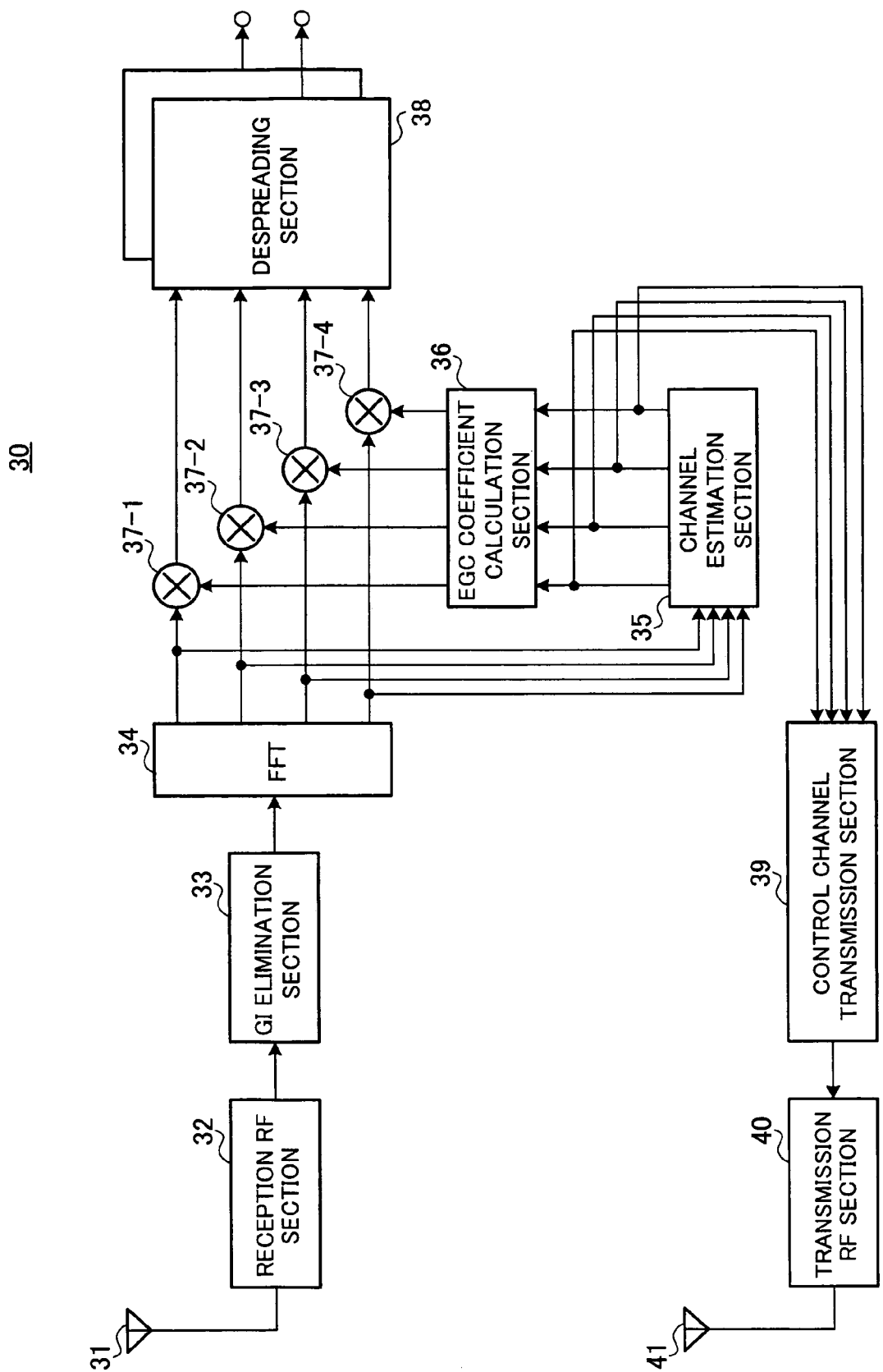
FIG. 2 is a block diagram showing the configuration of a conventional reception apparatus.

[FIG. 2]
32 RECEPTION RF SECTION
33 GI ELIMINATION SECTION
38 DESPREADING SECTION
36 EGC COEFFICIENT CALCULATION SECTION
35 CHANNEL ESTIMATION SECTION
39 CONTROL CHANNEL TRANSMISSION SECTION
40 TRANSMISSION RF SECTION

Figure 3:
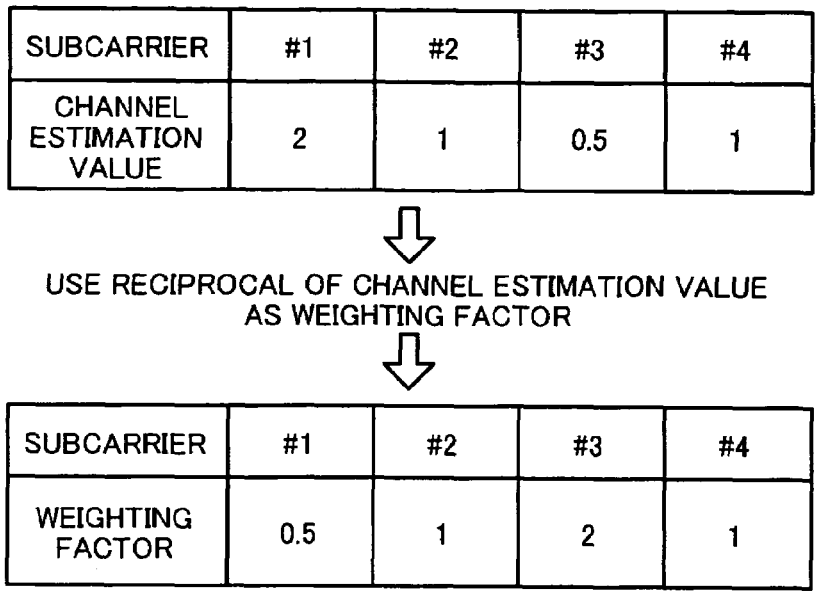
FIG. 3 is a schematic diagram showing conventional weighting factors.

[FIG. 3]
SUBCARRIER
CHANNEL ESTIMATION VALUE
USE RECIPROCAL OF CHANNEL ESTIMATION VALUE AS WEIGHTING FACTOR
SUBCARRIER
WEIGHTING FACTOR

Figure 4:
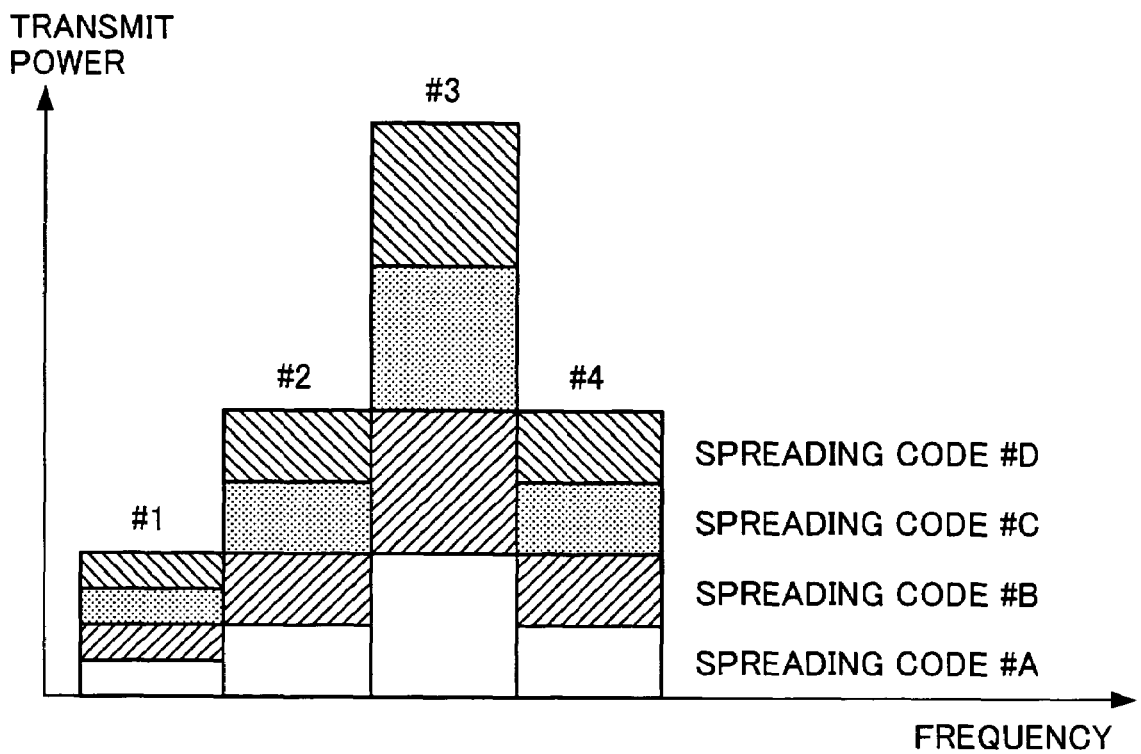
FIG. 4 is a schematic diagram showing conventional weighting results.

[FIG. 4]
TRANSMIT POWER
SPREADING CODE #D
SPREADING CODE #C
SPREADING CODE #B
SPREADING CODE #A
FREQUENCY

[FIG. 5]
100 TRANSMISSION APPARATUS
200 RECEPTION APPARATUS
300 RECEPTION APPARATUS

[FIG. 6]
CODE MULTIPLEXING NUMBER
111 SPREADING SECTION
116 GI ADDITION SECTION
117 TRANSMISSION RF SECTION
123 WEIGHTING FACTOR CALCULATION SECTION
105 SPREADING CODE DETERMINING SECTION
122 CHANNEL INFORMATION DETECTION SECTION
121-1, 121-2 CONTROL CHANNEL RECEPTION SECTION
120 RECEPTION RF SECTION

[FIG. 7]
232 RECEPTION RF SECTION
233 GI ELIMINATION SECTION
238 DESPREADING SECTION
236 MRC COEFFICIENT CALCULATION SECTION
235 CHANNEL ESTIMATION SECTION
239 CONTROL CHANNEL TRANSMISSION SECTION
240 TRANSMISSION RF SECTION

[FIG. 8]
SUBCARRIER
CODE #A
CODE #B
CODE #C
CODE #D

[FIG. 9]
TRANSMIT POWER
SPREADING CODE #D
SPREADING CODE #C
SPREADING CODE #B
SPREADING CODE #A
FREQUENCY

What is claimed is:

1. A radio transmission apparatus in a multicarrier CDMA system that transmits a signal by spreading the signal on a plurality of subcarriers, the apparatus comprising:
   a weighting section that assigns weights which vary from one spreading code to another and from one chip to another, to the spread subcarrier signals; and
   a transmission section that multiplexes the weighted and spread subcarrier signals and transmits the multiplexed signal,
   wherein weighting factors to be used for the weighting comprise weighting factors from which a signal having a maximum eigenvalue is extracted when a radio reception apparatus decomposes a matrix into eigenvalues using a spreading factor as the size of the matrix based on channel estimation value information for each subcarrier.

2. The radio transmission apparatus of claim 1 comprises one of a radio communication terminal apparatus and radio communication base station apparatus.

3. A radio transmission method for a multicarrier CDMA system that transmits a signal by spreading the signal on a plurality of subcarriers, the method comprising the steps of:
   assigning weights which differ from one spreading code to another and from one chip to another, to the spread subcarrier signals; and
   multiplexing the weighted and spread subcarrier signals and transmitting the multiplexed signal,
   wherein weighting factors to be used for the weighting comprise weighting factors from which a signal having a maximum eigenvalue is extracted when a radio reception apparatus decomposes a matrix into eigenvalues using a spreading factor as the size of the matrix based on channel estimation value information for each subcarrier.

* * * * *